United States Patent [19]

Malinge et al.

[11] Patent Number: 4,987,218
[45] Date of Patent: Jan. 22, 1991

[54] POLYBENSHYDROL COMPOSITIONS ENDING WITH ETHYLENIC UNSATURATED GROUPS, CROSS-LINKED POLYMIDES RESULTING FROM THEIR THERMAL POLYERMIZATION AND THE USE OF SAID COMPOSITIONS

[75] Inventors: Jean Malinge, Givors; Guy Rabilloud, Grenoble; Bernard Sillion, Lyon, all of France

[73] Assignee: Centre D'Etude des Materiaux Organiques pour Technologies Avances (Cemota), Vernaison, France

[21] Appl. No.: 55,287

[22] Filed: May 29, 1987

[30] Foreign Application Priority Data

Feb. 13, 1987 [FR] France .................. 87 01983

[51] Int. Cl.$^5$ ............ C08G 69/26; C08G 73/10
[52] U.S. Cl. .................. 528/353; 528/170; 528/183; 528/184; 528/331
[58] Field of Search ........... 528/353, 331, 170, 183, 528/184

[56] References Cited

U.S. PATENT DOCUMENTS

| | | | |
|---|---|---|---|
| 3,234,181 | 2/1966 | Olivier | 528/353 |
| 3,528,950 | 9/1970 | Lubowitz | 528/229 |
| 3,745,149 | 7/1973 | Serafini et al. | 528/288 |
| 3,936,404 | 2/1976 | Ishizuka et al. | 528/353 |
| 4,645,821 | 2/1987 | Malinge et al. | 528/353 |
| 4,736,015 | 4/1988 | Rabilloud et al. | 528/353 |

*Primary Examiner*—John Kight, III.
*Assistant Examiner*—P. Hampton-Hightower
*Attorney, Agent, or Firm*—Millen, White & Zelano

[57] ABSTRACT

Polymer compositions comprising poly(benzhydrolimide) chains ending with ethylenic unsautrated groups complying with the general formula:

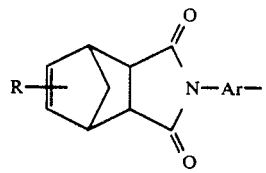

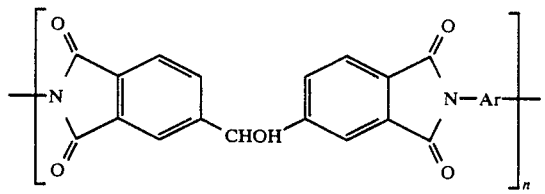

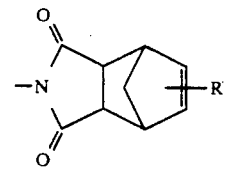

wherein Ar is a divalent aromatic radical and R a hydrogen atom or a monovalent hydrocarbon radical. They can be prepared by reacting, under imidation condition, at least one primary diamine with at least one benzydrol 3,3', 4,4'-tetracarboxylic acid, a bis (ortho-acid-ester) or a tetraester of such acid and with an anhydride, an acid-ester or a diester of dicarboxylic cycloaliphatic acid with ethylenic unsaturation. These compositions may be converted to cross-linked polymides by thermal polyemrization. They can be used in particular for manufacturing composite materials, adhesives, molded articles and protective coatings withstanding high temperatures.

19 Claims, No Drawings

POLYBENSHYDROL COMPOSITIONS ENDING WITH ETHYLENIC UNSATURATED GROUPS, CROSS-LINKED POLYMIDES RESULTING FROM THEIR THERMAL POLYERMIZATION AND THE USE OF SAID COMPOSITIONS

The present invention has for object new polybenzhydrolimide compositions ending with ethylenic unsaturated groups. These compositions have the advantage of being soluble, in a completely imidated state, in many organic solvents. Moreover, the solutions formed from said compositions have an excellent stability during storage, do not contain free aromatic amines, which are carcinogenic substances, and, after evaporation of the one or more solvents, they are fusible and, above a certain temperature, thermosetting. These compositions may be used as binders for manufacturing composite materials, as basic substances for adhesive compositions, foams and cellular materials. They are also adapted to the manufacture of molded articles and to the formation of insulating coatings.

The invention more particularly concerns polybenzhydrolimide compositions obtained by reacting at least one aromatic diamine with benzhydrol 3,3',4,4'-tetracarboxylic acid or with a bis (ortho-acid-ester) or a tetraester derived from said benzhydrol 3,3',4,4'-tetracarboxylic acid and an anhydride or an acid-ester or a diester derived from an unsaturated dicarboxylic acid. This reaction is performed at a sufficiently high temperature to form polybenzhydrolimides by condensation of amine groups on reactive groups of reactants having acid, anhydride and/or ester groups.

The invention also concerns cross-linked polyimides formed when said polybenzhydrolimide compositions are heated at a temperature from 200° C. to 350° C. It also concerns the use of thermosetting polybenzhydrolimide compositions for manufacturing composite materials, adhesives, molded articles or protective coatings withstanding high temperatures.

BACKGROUND OF THE INVENTION

Resins of aromatic polyimides are characterized by excellent physical and chemical properties and particularly by a high resistance to heat and to oxidation. Accordingly, they can be used in many applications for manufacturing films, varnishes or coatings withstanding high temperatures. But the aromatic polyimides are generally infusible and not or not very soluble in organic solvents. For this reason, the known techniques require the intermediary step of using a soluble, noncyclized polymer or a mixture of fusible reactants which, by suitable thermal treatment, may give a polymer material.

The most common synthesis comprises a first step of preparing a soluble polyamide-acid by reacting the dianhydride of a tetracarboxylic aromatic acid with an aromatic diamine in a polar aprotic solvent. These intermediary linear polymers may be macromolecular compounds of high molecular weight when the reactants are used in proportions close to the stoichiometry. But they may also be oligomers of low molecular weight when using an excess of one of the reactants, and then the end-chain functional groups are reacted with compounds having a latent reactivity.

These two types of precursor polymers of aromatic polyimides suffer however from the same disadvantages, resulting in particular from the insolubility of the imide form and from the instability of the amide-acid form. As a matter of fact, the polyamide-acids are very sensitive to heat and moistness, thus requiring to be kept at low temperature, preferably lower than 5° C., in anhydrous atmosphere and preferably under inert gas. The polyamide-acid resins are converted to polyimides by thermal or chemical cyclodehydration which is performed at the time of use. The cyclization occurs for example when the wet film of polyamide-acid is progressively heated from room temperature up to 300° C. or 350° C. This heating produced by the dehydration reaction leading to imide rings. As a general rule, this thermal treatment must be progressive and lasts several hours, for example 5–15 hours, in order to avoid the formation of bubbles or of important defects in the mass of the material. All this process explains that the polyamide-acids are not easily adapted to the manufacture of thick elements such as composite materials or moulded articles wherein the diffusion of the solvent or of the reaction water is very difficult, if not impossible.

Resins of aromatic polyimides of high molecular weight do exist which are soluble in organic solvents since the polymers forming them have dissymmetrical structures or carry bulky lateral groups, but these resins are not fusible even when their vitrous transition temperature is lower than 300° C. As a matter of fact, for manufacturing composite materials, the resin to be used as binder must be, at one stage, sufficiently fluid to wet, as perfectly as possible, the carrier consisting of fibers, fabrics or fillers. Also its viscosity, in molten state, must be adapted to the control of the different parameters of the compression molding.

According to one of the approaches proposed in U.S. Pat. No. 3,528,950, a prepolymer of lower molecular weight is prepared by reacting an aromatic diamine with a dianhydride of tetracarboxylic aromatic acid and a monoanhydride of unsaturated cycloaliphatic dicarboxylic acid. The reaction is conducted by heating the three reactants in a polar organic solvent with distillation of the reaction water. But this method provides two types of polymers having very different molecular weights and which are separately isolated. The polymers of higher molecular weight precipitate in the reaction medium and the others subsequently. After drying, the two products are admixed, as powder, and shaped by pressing at a temperature from 200° C. to 350° C., temperature at which the imide oligomers are cross-linked by polymerization of the ethylenic double bonds forming the chain ends. This method has the advantage of avoiding the problems of instability of the polyamide-acid solutions, but it requires an additional step for isolating the two types of polymers and readmix them. Moreover, these oligomers are not soluble in any proportion in the organic solvents.

Another technique, which seems particularly interesting, is proposed in U.S. Pat. No. 3,745,149, wherein a composition is prepared by admixing a diester or a tetraester of tetracarboxylic aromatic acid with an aromatic diamine and a monoester or diester of unsaturated dicarboxylic cycloaliphatic acid. These three reactants are dissolved in an organic solvent of relatively low boiling point, such for example as methanol and this monomer solution is used for impregnating fibers or fabrics which form the reinforcement of composite materials.

After evaporation of the most part of the solvent, imide oligomers are formed by polycondensation of the reactants at the time of use of the materials. This method has the advantage of using a system formed of fusible, soluble reactants and is compatible with the present technical means. For all these reasons, these resins, called PRM ("polymerization of reactive monomers") are increasingly used.

It must be observed, however, that, in spite of their indeniable advantages, the resins of this type suffer from disadvantages associated to their method of preparation. The most important disadvantages are the following:

The monomer solutions and the pre-impregnated materials prepared from these solutions are not stable and the characteristics of the products vary during time. It is hence necessary to keep them at a low temperature and preferably sheltered from moistness.

The monomer solutions and the pre-impregnated materials prepared from these solutions contain a substantial amount of free aromatic diamines which are known as highly carcinogenic. The use of these products requires protections at all levels to avoid that the users be exposed to these diamines.

The composite materials are directly manufactured from fabrics preimpregnated with the mixture of reactants by using a heating and pressure adjustment program which is very difficult to control. As a matter of fact, an object of this program is to perform the oligomerization accompanied with the release of a substantial amount of volatile products (water and alcohol), to complete the drying of the impregnated material and to produce a flow of the resin before polymerization of the ethylenic groups.

SUMMARY OF THE INVENTION

Now it has been discovered, and this is one of the objects of the invention, that, by using derivatives of benzhydrol 3,3',4,4'-tetracarboxylic acid to synthesize thermosetting polyimide compositions, it is possible to cope with all the above-mentioned disadvantages by effectively separating the step of oligomer formation, which is a polycondensation reaction, from the polymerization step. As a matter of fact, these polymers lead to compositions which, in completely imidated form, are very soluble in many polar organic solvents. The polycondensation reaction may thus be performed in optimum conditions in a suitable solvent until practically no free monomer is present in the reaction medium. Concentrated solutions, stable in solvents other than N-methylpyrrolidone which, as known, strongly enter in combination with carbon fibers, are thus obtained.

Fusible and soluble compositions of poly(benzhydrolimides) ended with groups comprising an ethylenic unsaturation according to the invention may be represented by the general formula:

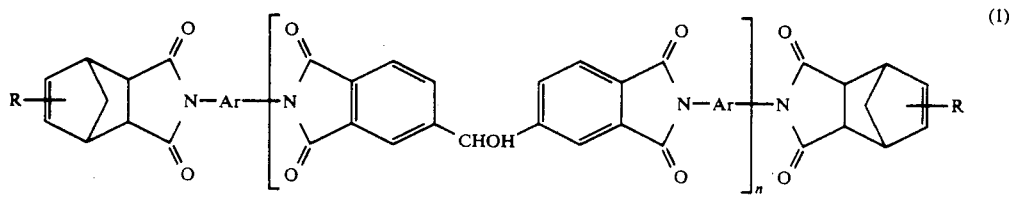

wherein Ar, n and R are defined as indicated below. These compositions are mainly prepared by reacting at least one primary aromatic diamine of general formula

$H_2N-Ar-NH_2$ (2)

with at least one tetracarboxylic aromatic compound of general formula

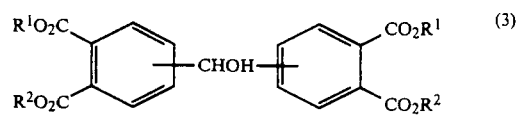

and at least one cycloaliphatic compound complying with one of the general formulas

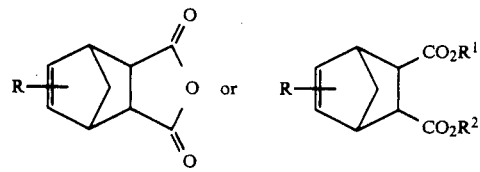

(4) (5)

In these formulas, radical Ar is a divalent aromatic radical, carbocyclic or heterocyclic, the two valences of which are on separate carbon atoms not in ortho position with respect to each other. Radical Ar may be formed of one ring or several rings, for example two to six rings, which may then be coupled or interconnected, each ring being preferably formed of five to seven atoms, a part of which may consist of oxygen, sulfur and/or nitrogen atoms.

When radical Ar comprises several interlinked rings, the linking elements are for example a single bond or one of the following atoms or groups:

—O—; —S—; —SO—; —SO$_2$—; —CH$_2$—; —CF$_2$—; —(CH$_3$)$_2$—; —C(CF$_3$)$_2$—; —CO—; —COO—; —CHOH—; —CONH—

$R^1$ and $R^2$, identical or different, are monovalent radicals of substantial hydrocarbon content, each of which preferably comprises from 1 to 13 carbon atoms, for example lower alkyl, cycloalkyl or aryl radicals. Then the compound of formula (3) is a tetraester or a mixture of tetraesters of benzhydrol 3,3',4,4'-tetracarboxylic acid and the compound of formula (5) is a diester or a mixture of diesters of a dicarboxylic unsaturated cycloaliphatic acid. Radical $R^1$ may also represent a hydrogen atom, $R^2$ being defined as above, and the compound of formula (3) then represents at least one bis(ortho-acid-ester), simply called diester of benzhydrol (3,3',4,4'-tetracarboxylic acid, whereas the compound of formula (5) represents at least one acid-ester or monoester, deriving from an unsaturated dicarboxylic acid. In the compound of formula (3), $R^1$ and $R^2$ may be both hydrogen atoms, the product being then benzhydrol 3,3',4,4'-tetracarboxylic acid.

In formula (3) the valences of a secondary alcohol group separating the two aromatic rings of benzhydrol are placed in the middle of the carbon-carbon bonds of these rings to indicate the presence of different isomers of position when the product is a bis(ortho-acid-ester) or a dissymmetrical tetraester.

In formulas (1), (4) and (5), R is a hydrogen atom or a monovalent hydrocarbon radical, for example a phenyl group or an alkyl radical containing one to four carbon atoms, preferably a methyl group.

In formula (1), n is an integer representative of the polycondensation degree of the main chain of aromatic poly(benzhydrolimides). The molecular weight of these compositions of poly(benzhydrolimides) ending with ethylenic reactive groups may be adjusted by varying the proportions of the different reactants, while maintaining the total stoichiometry between the amine groups and the antagonistic acid or ester groups.

The exact value of integer n is not directly accessible since the compositions according to the invention are formed of a mixture of oligomers whose molecular weights are statistically distributed about a mean value which is determined by the respective proportions of the different reactants and by the synthesis method. From the general formula (1) it appears that the average value of integer n may be easily calculated from the amounts of reactants since, for n moles of compound of formula (3), (n+1) moles of primary aromatic diamine (2) and two moles of compound (4) or (5) are necessary.

Examples of primary aromatic diamines of formula (2), convenient according to the invention, are: 1,3-benzenediamine, 1,4-benzenediamine, methylenebis 3,3'-(benzeneamine), methylenebis 4,4'-(benzeneamine), oxybis-3,3'-(benzeneamine), oxybis-4,4'-(benzeneamine), thiobis 3,3'-(benzene-amine), thiobis 4,4'-(benzeneamine), sulfonylbis 3,3'-(benzeneamine), sulfonylbis 4,4'-(benzeneamine), bis(3-aminophenyl)ketone, bis(4-aminophenyl)ketone, 2,2-bis(4-aminophenyl 3,3'-diaminobenzhydrol, 4,4'-diaminobenzhydrol, 2,2-bis(4-aminophenyl) propane, 4,4'-diaminodiphenyl, 4,4'-diamino 3,3'-dimethoxydiphenyl, 3,3'-diaminobenzanilide, 3,4'-diaminobenzanilide, 4,4'-diaminobenzanilide, 3,4'-diaminobenzanilide, 3,3'-diaminophenylbenzoate, 4,4'-diaminophenylbenzoate, bis(4-aminophenyl)dimethylsilane, bis 1,2-(4-aminophenyl) tetramethyldisiloxane, bis 1,4-(4-aminophenoxy) benzene, bis 1,3(3-aminophenoxy) benzene and bis 2,2-(4-(4-aminophenoxy)phenyl) propane.

Examples of compounds of formula (3), convenient for the present invention, are: benzhydrol 3,3',4,4'-tetracarboxylic acid, bis (ortho-acidesters) of said acid, such as methyl diester, ethyl diester, n-propyl diester, isopropyl diester, n-butyl diester, isobutyl diester, amyl diester, hexyl diester, 2-hydroxyethyl diester and trifluoroethyl diester, tetraesters such as tetramethyl ester, tetraethyl ester, tetrabutyl ester, tetraphenyl ester, dimethyldiphenyl ester and diethyldiphenyl ester.

Usually, the dissymmetrical diesters and tetraesters of benzhydrol 3,3',4,4'-tetracarboxylic acid are not pure compounds but a mixture of isomers. For example methyl diester may be a mixture, in variable proportions, of 3,3'-dicarboxy 4,4'-dimethoxycarbonyl benzhydrol, of 4,4'-dicarboxy 3,3' dimethoxycarbonyl benzhydrol and of 3,4' dicarboxy 4,3' dimethoxycarbonyl benzhydrol.

Examples of compounds of formulas (4) and (5), convenient for the present invention, are the anhydrides of (2,2,1) bicyclo 5-heptene 2,3-dicarboxylic and 5-methyl (2,2,1) bicyclo 5-heptene 2,3-dicarboxylic acids, the monoesters of said acids such as methyl ester, ethyl ester, n-propyl ester, isopropyl ester, n-butyl ester, isobutyl ester, amyl ester, hexyl ester, 2-hydroxy ethyl ester, trifluoroethyl ester, diesters of said acids as methyl diester, ethyl diester, n-propyl diester, isopropyl diester, n-butyl diester, isobutyl diester, amyl diester, hexyl diester, 2-hydroxyethyl diester, phenyl diester and trifluoroethyl diester.

The compositions of poly(benzhydrolimides) ending with ethylenic groups according to the invention may be prepared by admixing in a suitable organic solvent the three basic reactants which are a diprimary aromatic diamide of formula (2), a compound of formula (3) deriving from benzhydrol 3,3',4,4'-tetracarboxylic acid and a cycloaliphatic compound of formula (4) or (5), used in respective proportions depending on the desired average molecular weight.

In most of the applications, this average molecular weight is so adjusted that the melting or softening temperature of the compositions according to the invention range for example from 150° C. to 300° C., preferably from 150° C. to 250° C. As a matter of fact, the thermal polymerization of the ending ethylenic double bonds must preferably be achieved when the compositions according to the invention are brought to a temperature higher than their melting or softening temperature. The above-mentioned melting temperatures, ranging from 150° C. to 250° C., are obtained when the compositions of poly(benzhydrolimides) according to the invention have an average number molecular weight ranging from 1000 to 10000 grams per mole preferably from 1000 to 3000 grams per mole.

The reaction mixture is then heated to a temperature advantageously higher than 80° C., preferably ranging from 100° to 250° C., until the polycondensation and the formation of imide rings is completed.

The solvents to be used for preparing the poly(benzhydrolimide) compositions with ethylenic ending groups according to the invention are preferably polar organic compounds, i.e. compounds containing an heteroatom such as O, N, S, P, Cl, inert with respect to the monomers and the polymers. Examples of such solvents are phenol, cresols, xylenols, chlorophenols, ethers such as anisole, mono- and diethers of glycols, such for example as those of ethyleneglycol, diethyleneglycol, triethylene glycol, propyleneglycols, 1,4-butanediol, mono and diesters of said glycols, ether-esters of said glycols, amides, such as for example methylformamide, dimethylformamide, methylacetamide, dimethylacetamide, hexamethylphosphoramide, ureas, such for example as tetramethylurea, heterocyclic compounds, such for example as pyridine, quinoline, dioxane, tetrahydrofuran, N-methyl 2-pyrrolidinone, N-cyclohexyl 2-pyrrolidinone, N-acetyl 2-pyrrolidinone, tetramethylene sulfone, sulfones and sulfoxides, such for example as dimethylsulfone or dimethylsulfoxide.

These solvents may be used alone or admixed with each other, or still in admixture with other liquid organic compounds which are not solvents for the polymers but may act as diluents for adjusting the viscosimetry properties of the solutions. Examples of these compounds are methanol, ethanol, 1-propanol, 2-propanol, butanols or benzyl alcohol, ketones such for example as acetone, 2-butanone, 4-methyl 2-pentanone, 2,4-dimethyl 2-pentanone, cyclohexanone or acetophenone, aromatic hydrocarbons such for example as benzene, toluene or xylenes, naphtha solvent, halogenated hydrocarbons such for example as dichloromethane, trichloromethane, 1,1,2,2-tetrachloro ethane, freons, chlorobenzene, dichlorobenzenes or chlorotoluenes, aliphatic and aromatic esters of aliphatic and aromatic acids such for example as methyl, ethyl, isopropyl, butyl, phenyl acetates or methyl benzoate, ethers such for example as dipropyl, diisopropyl, dibutyl or diphenyl ether.

The initial monomer concentration in the reaction solvent is not critical but it generally ranges from 20% to 80% by weight.

The poly(benzhydrolimide) compositions ending with ethylenic unsaturated groups according to the invention may be subjected to a thermal polymerization at a temperature for example of 200°–350° C., so as to form cross-linked products.

As above-indicated, the poly(benzhydrolimide) compositions of the invention, which are thermosetting above a certain temperature, may be used to manufacture composite materials, adhesives, molded articles or protective coatings, particularly insulating coatings, withstanding high temperatures. For these applications, conventional techniques, well-known in the art, can be used.

EXAMPLES

The invention will be described more in detail by the following specific examples given hereinafter for illustrative and not limitative purpose.

In these examples, the polycondensation reactions are preferably performed in atmosphere of inert gas (nitrogen or argon) to avoid oxidation of the amide groups by oxygen of the atmosphere. The inherent viscosity of the poly(benzhydrolimide) compositions ending with ethylenic groups, expressed in dl/g, is measured at 30° C. for a concentration by weight of 5 g of product in one liter of N-methyl 2-pyrrolidinone. The dynamic viscosity of the solutions is determined at a temperature of 25° C. with a Haake Rotovisco RV 12 viscosimeter equipped with a cone and plate measuring system. The average number molecular weights, when indicated, are calculated from the respective proportions of the reactants. The vitrous transition temperatures are measured by thermomechanical analysis and by penetrometry, using a rate of temperature increase of 10° C. per minute. Example 1 is given for comparative purpose.

EXAMPLE 1 (COMPARATIVE)

This example is given to show the different solubilities of oligomers prepared from the compounds of the prior art, i.e. the methyl diesters of benzophenone 3,3',4,4'-tetracarboxylic acid and of the oligomers of the present invention as described in the following examples. It also shows that the monomer solutions are not stable during time when said solutions are stored at room temperature.

A mixture of 536.62 grams of methyl diester of benzophenone 3,3',4,4'-tetracarboxylic acid, 407.6 grams of methylene 4,4'-bis(benzeneamine), 261.6 grams of methyl monoester of 5-methyl (2,2,1) bicyclo 5-heptene 2,3-dicarboxylic acid and 1200 grams of methanol are introduced into a 3 liter reactor. The respective proportions of the various above-mentioned reactants are so determined as to give a mixture of oligomers whose average number molecular weight is about 1500. This solution is stored in a tight flask at room temperature for 2 months. At the end of this period the reaction mixture contains a solid precipitate which was formed progressively. This product is separated by filtration and, by chemical analysis, is identified as the diimide formed by reaction of two moles of methyl monoester of 5-methyl (2,2,1)bicyclo 5-heptene 2,3-dicarboxylic acid with one mole of methylene 4,4'-bis(benzeneamine).

A mixture exactly identical to the preceding one is prepared by replacing methanol, used as solvent, by 1000 grams of diglyme. The solution, under stirring, is progressively heated up to 140° C. but, as soon as the inner temperature reaches 100° C., the oligomers begin to precipitate in the reaction medium and, even after addition of 1000 grams of additional solvent, the precipitation continues and the imidation reaction is performed in solid phase. Accordingly, the imide oligomers cannot be used to impregnate carbon fibers or fabrics essentially formed of carbon or glass fibers.

EXAMPLES 2 TO 5

These examples describe the preparation of poly(benzhydrolimide) compositions ending with ethylenic reactive groups, from mixtures of methyl diester of benzhydrol 3,3',4,4'-tetracarboxylic acid, of methylene 4,4'-bis(benzeneamine), of methyl monoester of 5-methyl (2,2,1)dicyclo 5-heptene 2,3-dicarboxylic acid, and of diglyme used as solvent. These mixtures are prepared with the reactant proportions indicated in table 1 and introduced in a 3 liter reactor.

The solution is heated to 140° C. and maintained at said temperature for 3 hours. During this polycondensation and imidation step, the volatile compounds (water and methanol) are removed from the reaction medium by distillation. The temperature is then brought to 160° C. for 1 hour to complete the imidation reaction.

The poly(benzhydrolimide) compositions ending with ethylenic reactive groups, prepared in these reactions, are generally used as solutions, as they are obtained at the end of the reaction. When it is necessary to obtain oligomers in solid state, either for changing the solvent or for molding purpose, the solution is poured into water under vigorous stirring. The formed precipitate is washed several times with water and dried under vacuum at 100° C. for several hours.

TABLE 1

| Example $N_o$ | Weight in grams of | | | $Mn^*$ | $n^*$ | Inherent viscosity (dl/g) |
|---|---|---|---|---|---|---|
| | Diester | Monoester | Diamine | | | |
| 2 | 406.67 | 392.40 | 405.80 | 1000 | 1.05 | 0.07 |
| 3 | 537.20 | 261.60 | 406.40 | 1500 | 2.08 | 0.10 |
| 4 | 641.50 | 156.90 | 406.80 | 2500 | 4.13 | 0.17 |
| 5 | 719.90 | 78.50 | 407.24 | 5000 | 9.27 | 0.35 |

*Mn is the number average molecular weight and n the polycondensation degree as defined for the oligomer compositions of formula (1).

EXAMPLE 6

An object of this example is to show the advantages of the compositions according to the invention as compared with the prior art compositions. A portion of the solution of example 3 (50 grams) is poured into 0.3 liter of water vigorously stirred by means of "ultra-turrax". The formed precipitate is placed into an extraction cartridge which is placed into a Kumagawa extractor. The water wherein the polymer precipitated is used to extract the hydrosoluble products contained in the oligomer composition. The operation is conducted at a temperature of 100° C. for one week. After cooling, the aqueous solution is analyzed by spectroscopy in UV to determine the amount of free methylene 4,4'-bis(benzeneamine). The obtained value of 0.00024 mole of free amine corresponds, in the mother liquor, to an aromatic amine content lower than one part per thousand. By way of comparison, the monomer compositions according to the prior art contain from 18 to 20% by weight of free aromatic diamine.

A solution containing about 50% by weight of the composition of example 3 in diglyme is stored at room temperature in the conditions described in comparative example 1. This solution has a dynamic viscosity of 20 Pa.s and the oligomers have an inherent viscosity of 0.11 dl/g. After two months of storage, the solution is perfectly limpid and the above-incated values for the dynamic viscosity and the inherent viscosity are unchanged.

EXAMPLE 7

The solutions of poly(benzhydrolimides) with ethylenic end groups described in examples 2, 3 and 4 are used to lay, onto glass plates, wet films of 200 micron thickness. The solvent is evaporated for 30 minutes at 100° C. and 30 minutes at 200° C. These films, laid on the glass, are then subjected to thermomechanical analysis in order to determine the vitrous transition temperature (Tg) of the products. The results are reported in table 2.

TABLE 2

| Composition of example $n_o$ | Mn (calculated) | Tg (°C.) |
| --- | --- | --- |
| 2 | 1000 | 170 |
| 3 | 1500 | 210 |
| 4 | 2500 | 240 |

EXAMPLE 8

The solution of poly(benzhydrolimide) oligomers of example 3 is used to impregnate a glass felt. The sample is placed into a measuring system inside a thermally controlled furnace. One end of said sample is subjected to alternate twisting whereas the other end is connected to a torquemeter to follow the stiffness increase resulting from the thermal cross-linking of the ending ethylenic double bonds. This survey is conducted at different temperatures, in isothermal conditions, so as to determine a gelation time of the product at each of said temperatures. This gelation time corresponds to the point of the curve at which the polymerization velocity is maximum (inflection point) and the obtained values are reported in table 3.

TABLE 3

| Temperature (°C.) | Gelation time (minutes) |
| --- | --- |
| 250 | 50 |
| 275 | 45 |
| 300 | 25 |
| 325 | 15 |

What is claimed as the invention is:

1. A polymer composition characterized in that it comprises poly(benzhydrolimide) chains ending with ethylenic unsaturated groups, represented by the general formula

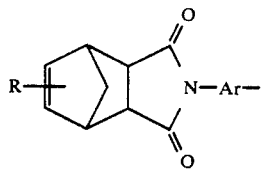

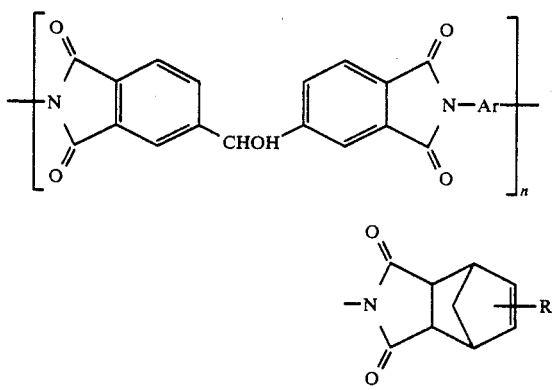

wherein Ar is a divalent aromatic radical, carbocyclic or heterocyclic, formed of one or more rings, the two valences of which are on separate carbon atoms not in ortho position with respect to each other, R is a hydrogen atom or a monovalent hydrocarbon radical, and number n represents the average polycondensation degree of said poly(benzhydrolimide) chains.

2. A polymer composition according to claim 1, characterized in that R is a hydrogen atom, a phenyl radical or an alkyl radical of 1–4 carbon atoms.

3. A polymer composition according to claim 1, characterized by a polycondensation degree corresponding to an average number molecular weight from 1 000 to 10 000.

4. A process for preparing a polymer composition according to claim 1, characterized by the reaction, under imidation conditions, of at least one primary aromatic diamine of the general formula NH$_2$—Ar—NH$_2$ with at least one tetracarboxylic aromatic compound of general formula

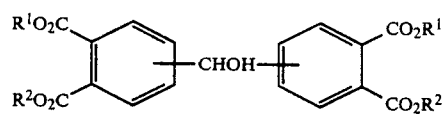

wherein R$^1$ and R$^2$, identical or different, are each a hydrogen atom or a monovalent radical of substantial hydrocarbon content, and at least one dicarboxylic cycloaliphatic compound with ethylenic unsaturation, complying with one of the general formulas

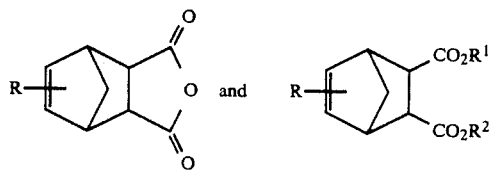

wherein R$^1$ and R$^2$ are defined as above, Ar and R being defined as in one of claims 1 and 2.

5. A process according to claim 4, wherein each of R$^1$ and R$^2$ is a hydrogen atom, characterized in that said tetracarboxylic aromatic compound is benzhydrol 3,3',4,4'-tetracarboxylic acid.

6. A process according to claim 4, wherein R$^1$ is hydrogen and R$^2$ a monovalent radical of substantial hydrocarbon content, having 1 to 13 carbon atoms, characterized in that the tetracarboxylic aromatic compound is at least one bis(ortho-acid-ester) of benzhydrol 3,3',4,4',-tetracarboxyxylic acid.

7. A process according to claim 4, wherein each of $R^1$ and $R^2$ is a monovalent radical of substantial hydrocarbon content, having 1 to 13 carbon atoms, characterized in that said tetracarboxylic aromatic compound is at least one tetraester of benzhydrol 3,3',4,4'-tetracarboxylic acid.

8. A process according to claim 4, characterized in that the dicarboxylic cycloaliphatic compound with ethylenic unsaturation, represented by formula

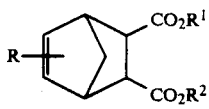

is at least one acid-ester, $R^1$ being the hydrogen atom and $R^2$ a monovalent radical of substantial hydrocarbon content, having 1–13 carbon atoms.

9. A process according to claim 4, characterized in that the dicarboxylic cycloaliphatic compound with ethylenic unsaturation of formula

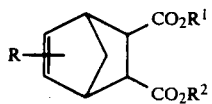

is at least one diester, each of $R^1$ and $R^2$ being a monovalent radical of substantial hydrocarbon content having 1 to 13 carbon atoms.

10. A process according to claim 4, characterized in that the reaction is performed within a solvent, with proportions of reactants adapted to obtain the desired polycondensation degree and at a sufficient temperature to achieve the polycondensation.

11. A method for cross-linking a composition according to claim 1, characterized in that said composition is subjected to thermal polymerization at a temperature from 200° to 350° C.

12. A polymer composition of claim 1, wherein said polymer composition has a number average molecular weight of 1000 to 3000.

13. A polymer composition of claim 1, wherein Ar comprises one to six rings, which may be coupled or interconnected.

14. A polymer composition of claim 13, wherein said rings contain five to seven atoms.

15. A polymer composition of claim 13, wherein said rings may be linked by a single bond, —O—, —S—, —SO—, —SO$_2$—, —CH$_2$—, —CF$_2$—, —C(CH$_3$)$_2$—, —C(CF$_3$)$_2$—, —CO—, COO—, —CHOH—, or —CONH—.

16. A process according to claim 10, wherein said solvent is a heteroatom-containing polar organic compound.

17. A cross-linked product obtained by heating a composition of claim 1 at a temperature of 200°-350° C.

18. An adhesive composition comprising a composition of claim 17.

19. A molded article comprising a molded composition of claim 17.

* * * * *

UNITED STATES PATENT AND TRADEMARK OFFICE
CERTIFICATE OF CORRECTION

PATENT NO. : 4,987,218
DATED : January 22, 1991
INVENTOR(S) : Malinge et al It is certified that error appears in the above-identified patent and that said Letters Patent is hereby corrected as shown below:

Title Page, Title:

Reads: "POLYBENSHYDROL COMPOSITIONS ENDING WITH ETHYLENIC UNSATURATED GROUPS, CROSS-LINKED POLYMIDES RESULTING FROM THEIR THERMAL POLYERMIZATION AND THE USE OF SAID COMPOSITIONS."

Should Read: --POLYBENZHYDROL COMPOSITIONS ENDING WITH ETHYLENIC UNSATURATED GROUPS, CROSS-LINKED POLYIMIDES RESULTING FROM THEIR THERMAL POLYMERIZATION AND THE USE OF SAID COMPOSITIONS.--

Title Page, Assignee:

Reads: "Centre D'Etude des Materiaux Organiques pour Technologies Avances (Cemota), Vernaison, France"

Should Read: --Centre D'Etude des Materiaux Organiques pour Technologies Avancees (Cemota), Vernaison, France--

Signed and Sealed this

Twenty-first Day of July, 1992

*Attest:*

DOUGLAS B. COMER

*Attesting Officer*     Acting Commissioner of Patents and Trademarks